(12) United States Patent
Miyajima

(10) Patent No.: US 9,454,445 B2
(45) Date of Patent: Sep. 27, 2016

(54) FAULT TOLERANT SERVER

(71) Applicant: NEC Corporation, Minato-ku, Tokyo (JP)

(72) Inventor: Hiroaki Miyajima, Tokyo (JP)

(73) Assignee: NEC CORPORATION, Tokyo (JP)

(*) Notice: Subject to any disclaimer, the term of this patent is extended or adjusted under 35 U.S.C. 154(b) by 165 days.

(21) Appl. No.: 14/204,567

(22) Filed: Mar. 11, 2014

(65) Prior Publication Data

US 2014/0281674 A1   Sep. 18, 2014

(30) Foreign Application Priority Data

Mar. 15, 2013 (JP) ................... 2013-053712

(51) Int. Cl.
*G06F 11/20* (2006.01)
*G06F 11/14* (2006.01)

(52) U.S. Cl.
CPC ....... *G06F 11/2038* (2013.01); *G06F 11/1484* (2013.01); *G06F 11/2097* (2013.01); *G06F 2201/81* (2013.01)

(58) Field of Classification Search
CPC ........... G06F 11/1484; G06F 11/2097; G06F 11/2038
See application file for complete search history.

(56) References Cited

U.S. PATENT DOCUMENTS

2012/0226832 A1* 9/2012 Niino ............... G06F 13/00 710/33
2014/0201574 A1* 7/2014 Manchek ........... G06F 11/1407 714/38.13

OTHER PUBLICATIONS

Brendan Cully et al., "Remus: High Availability via Asynchronous Virtual Machine Replication", USENIX Association, NSDI '08:5th USENIX Symposium on Networked Systems Design and Implementation, [online], [searched on Mar. 5, 2013], Internet, <URL:http://nss.cs.ubc.ca/remus/papers/remus-nsdi08.pdf>, pp. 161-174. See cited Non-Patent Document 1 on p. 5, [0012] of the Applicant's Specification for explanation of relevance.

* cited by examiner

*Primary Examiner* — Jigar Patel

(57) ABSTRACT

The virtual computer of the active system includes a memory configured of small regions grouped in a first group and small regions grouped in a second group. When a checkpoint is detected by the checkpoint detection unit, the transfer control unit suspends the virtual computer, copies, to a transfer buffer (not shown), data of the small regions in the first group among the small regions of the memory having been updated after a previous checkpoint, and after inhibiting writing to the small regions in the second group, restarts the virtual computer. Further, the transfer control unit copies data of the small regions, in which writing is inhibited, to the transfer buffer and releases write inhibit, and transfers the data of the small regions, having been copied to the transfer buffer, to the physical computer.

7 Claims, 12 Drawing Sheets

FIG. 9
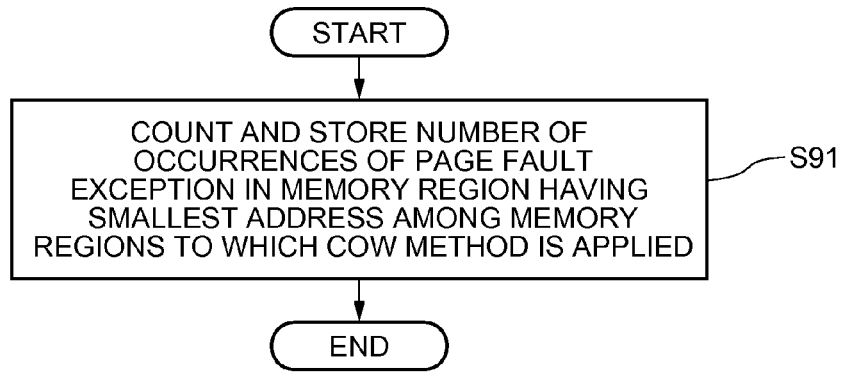
(A)
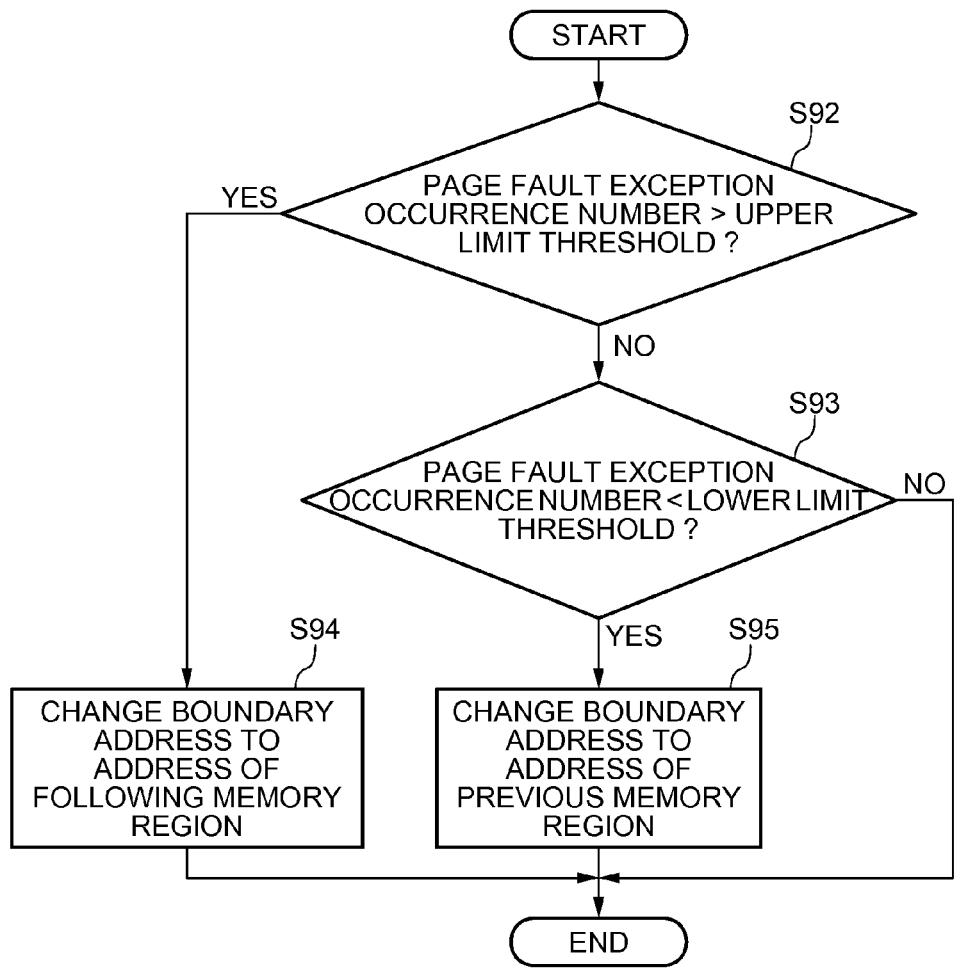
(B)

FAULT TOLERANT SERVER

INCORPORATION BY REFERENCE

The present application is based upon and claims the benefit of priority from Japanese patent application No. 2013-053712, filed on Mar. 15, 2013, the disclosure of which is incorporated herein in its entirety by reference.

TECHNICAL FIELD

The present invention relates to a fault tolerant server, a physical computer, a transfer method, and a program.

BACKGROUND ART

As a computer system having high availability, a fault tolerant server (FT server) has been known. The approaches to realize an FT server include a hardware approach and a software approach.

In a hardware-based FT server, main hardware components such as a CPU, a memory, and a storage are made redundant. A module including a CPU, a memory, and a chip set is called a CPU subsystem, and a module including various IO devices is called an IO subsystem. CPU subsystems and IO subsystems are different in the duplexing method. In the CPU subsystems, operations of the hardware are completely synchronized in clock units. This is called lock-step. As both systems perform completely the same operations, when a failure occurs, the failed CPU subsystem is separated logically and the normal CPU subsystem is caused to continue operation. As such, CPU subsystems do not have the concepts of an active system and a standby system. Meanwhile, in IO subsystems, one is used as an active system and the other is used as a standby system, and duplexing control is performed by software. When a failure occurs in an IO subsystem of an active system, the failure is detected by software, and the operation is immediately switched to a standby system. A hardware-based FT server is able to realize extremely high availability. However, as it is configured of special hardware, it takes a higher introduction cost compared with a PC server of similar performance.

A software-based FT server uses a virtual technique which enables a plurality of OSs to operate on a physical computer. A computer virtually constructed on a physical computer is called a virtual computer or a virtual machine. In a software-based FT server, redundant physical computers are used, and a virtual computer of an active system and a virtual computer of a standby system are arranged on different physical computers, respectively. When a failure such as a hardware error occurs in the physical computer on which the virtual computer of the active system operates, the processing performed by such a virtual computer is continuously performed by the virtual computer of the standby system on the other physical computer. In order to continue the service transparently when viewed from the application and OS, the software-based FT server performs processing to match the states of the virtual computers of the active system and the standby system with each other, namely, synchronization.

Here, a software-based FT server will be described with reference to FIG. 12. Referring to FIG. 12, a physical computer 1010 and a physical computer 1020 are communicably connected with each other via a communication path 1030.

The physical computer 1010 includes a VMM (Virtual computer Monitor; also called as supervisor) 1011 providing a virtual computer environment, a virtual computer 1013 of an active system which operates under the virtual computer environment provided by the VMM 1011, and a guest OS (operating system) operates on the virtual computer 1013.

The physical computer 1020 includes a VMM 1021 providing a virtual computer environment, and a virtual computer 1023 of a standby system which operates under the virtual computer environment provided by the VMM 1021. It should be noted that as a guest OS does not operate on the virtual computer 1023 of the standby system, it is shown by a dashed line.

As described above, in the FT server, the states of the virtual computers 1013 and 1023 of the active system and the standby system are made to match with each other. As such, when a failure occurs in the physical computer 1010 or in the VMM 1011 so that operation of the virtual computer 1013 of the active system is not able to continue operation, the processing performed by the virtual computer 1013 of the active system can be performed continuously by the virtual computer 1023 of the standby system.

Among the various kinds of processing to synchronize the virtual computers 1013 and 1023, processing requiring the longest time is processing to match the content of the memory (guest physical memory). In a typical computer system, a memory is managed in units having a certain size which is called a page. Whether or not writing has been performed can be checked in page units. As such, processing to match memory content is performed in page units.

For example, in Non-Patent Document 1 shown below, contents of memories 1014 and 1024 are made to match with each other by the following method (here, it is called a bulk copy method). Specifically, when a checkpoint comes, the virtual computer 1013 of the active system is suspended so as to interrupt update to the main memory 1014, and all of the pages (dirty pages) on the memory 1014, which have been updated after the previous checkpoint, are copied to a transfer buffer 1012. Then, upon completion of the local copy, the suspended virtual computer 1013 of the active system is restarted, and along with it, the dirty pages copied to the transfer buffer 1012 are transferred to the physical computer 1020 of the standby system. Thereby, the VMM 1021 in the physical computer 1020 copies the dirty pages, transferred from the physical computer 1010, to the memory 1024 of the virtual computer 1023 of the standby system so as to make the contents of the memories 1014 and 1024 match with each other.

Meanwhile, a method called copy on write (COW) is also known. In the COW method, when a checkpoint comes, the virtual computer 1013 of the active system is suspended so as to interrupt update to the main memory 1014, and by setting a write inhibit flag to an entry related to a dirty page of the page table, for example, writing to the dirty pages is inhibited. When writing to all of the dirty pages is inhibited, the virtual computer 1013 of the active system is restarted, the dirty pages on the memory 1014 are copied to the transfer buffer 1012, and the write inhibit is released. Then, in parallel with the copying to the transfer buffer 1012, the dirty pages copied to the transfer buffer are transferred to the physical computer 1020. It should be noted that if a write request to the dirty page, to which writing is inhibited, is made (if a page fault exception occurs), the virtual computer 1013 of the active system is suspended, and the dirty page to which a write request has occurred, is copied to the transfer buffer, and then the write inhibit is released. Then, the virtual computer 1013 of the active system is restarted, and in parallel with it, the dirty pages copied to the transfer buffer 1012 are transmitted to the physical computer 1020.

Non-Patent Document 1: Brendan Cully, and 5 others, "Remus: High Availability via Asynchronous Virtual Machine Replication" [online], [searched on Mar. 5, 2013], Internet, <URL: http://nss.cs.ubc.ca/remus/papers/remus-nsdi08.pdf>

As described above, as methods of making the memory content of a virtual computer of an active system and the memory content of a virtual computer of a standby system match with each other, there are two types of methods namely a COW method and a bulk copy method.

While there is a case where the suspended period of a virtual computer is reduced if a COW method is used, there is also a case where the suspended period of a virtual computer is reduced if a bulk copy method is used. As such, in a system that a method to be used for the entire memory is fixed to either a COW method or a bulk copy method, it is difficult to reduce the suspended period of a virtual computer.

SUMMARY

In view of the above, an exemplary object of the present invention is to provide a fault tolerant server capable of solving the above-described problem, that is, a problem that it is difficult to reduce the suspended period of a virtual computer in a system that a method to be used for the entire memory is fixed to either a COW method or a bulk copy method.

A fault tolerant server, according to an exemplary aspect of the present invention, includes a first physical computer on which a virtual computer of an active system operates, and a second physical computer on which a virtual computer of a standby system operates.

The virtual computer of the active system includes a memory configured of a plurality of small regions grouped in a first group and a plurality of small regions grouped in a second group.

The first physical computer includes
a checkpoint detection unit that detects a checkpoint; and
a transfer control unit that performs first processing and second processing. The first processing includes, when a checkpoint is detected by the checkpoint detection unit, suspending the virtual computer of the active system, copying, to a transfer buffer, data of the small regions in the first group among the small regions of the memory having been updated after a previous checkpoint, and after inhibiting writing to the small regions in the second group, restarting the virtual computer of the active system. The second processing includes copying data of the small regions, in which writing is inhibited, to the transfer buffer and releasing write inhibit, and transferring the data of the small regions, having been copied to the transfer buffer, to the second physical computer.

A physical computer, according to another exemplary aspect of the present invention, is a physical computer on which a virtual computer of an active system operates. The virtual computer includes a memory configured of a plurality of small regions grouped in a first group and a plurality of small regions grouped in a second group. The physical computer includes
a checkpoint detection unit that detects a checkpoint; and
a transfer control unit that performs first processing and second processing. The first processing includes, when a checkpoint is detected by the checkpoint detection unit, suspending the virtual computer of the active system, copying, to a transfer buffer, data of the small regions in the first group among the small regions of the memory having been updated after a previous checkpoint, and after inhibiting writing to the small regions in the second group, restarting the virtual computer of the active system. The second processing includes copying data of the small regions, in which writing is inhibited, to the transfer buffer and releasing write inhibit, and transferring the data of the small regions, having been copied to the transfer buffer, to the second physical computer.

A transfer method, according to another exemplary aspect of the present invention, is a transfer method implemented by a computer including a virtual computer of an active system, a checkpoint detection unit, and a transfer control unit. The virtual computer includes a memory configured of a plurality of small regions grouped in a first group and a plurality of small regions grouped in a second group. The method includes
by the checkpoint detection unit, detecting a checkpoint; and
by the transfer control unit, performing first processing and second processing. The first processing includes, when a checkpoint is detected by the checkpoint detection unit, suspending the virtual computer of the active system, copying, to a transfer buffer, data of the small regions in the first group among the small regions of the memory having been updated after a previous checkpoint, and after inhibiting writing to the small regions in the second group, restarting the virtual computer of the active system. The second processing includes copying data of the small regions, in which writing is inhibited, to the transfer buffer and releasing write inhibit, and transferring the data of the small regions, having been copied to the transfer buffer, to the second physical computer.

A computer-readable storage medium, according to another exemplary aspect of the present invention, is a medium storing a program for causing a computer, on which a virtual computer of an active system operates, to function as a checkpoint detection unit and a transfer control unit. The virtual computer includes a memory configured of a plurality of small regions grouped in a first group and a plurality of small regions grouped in a second group. The checkpoint detection unit detects a checkpoint, and the transfer control unit performs first processing and second processing. The first processing includes, when a checkpoint is detected by the checkpoint detection unit, suspending the virtual computer of the active system, copying, to a transfer buffer, data of the small regions in the first group among the small regions of the memory having been updated after a previous checkpoint, and after inhibiting writing to the small regions in the second group, restarting the virtual computer of the active system. The second processing includes copying data of the small regions, in which writing is inhibited, to the transfer buffer and releasing write inhibit, and transferring the data of the small regions, having been copied to the transfer buffer, to the second physical computer.

According to the present invention, it is possible to achieve an advantageous effect that a suspended period of a virtual computer in an active system can be reduced, compared with a case where only a COW method or a bulk copy method is used.

BRIED DESCRIPTION OF DRAWINGS

FIG. 9 is a flowchart showing exemplary processing of a boundary address determination unit 106

EXEMPLARY EMBODIMENTS

Next, exemplary embodiments of the present invention will be described in detail with reference to the drawings.

Figure 1:
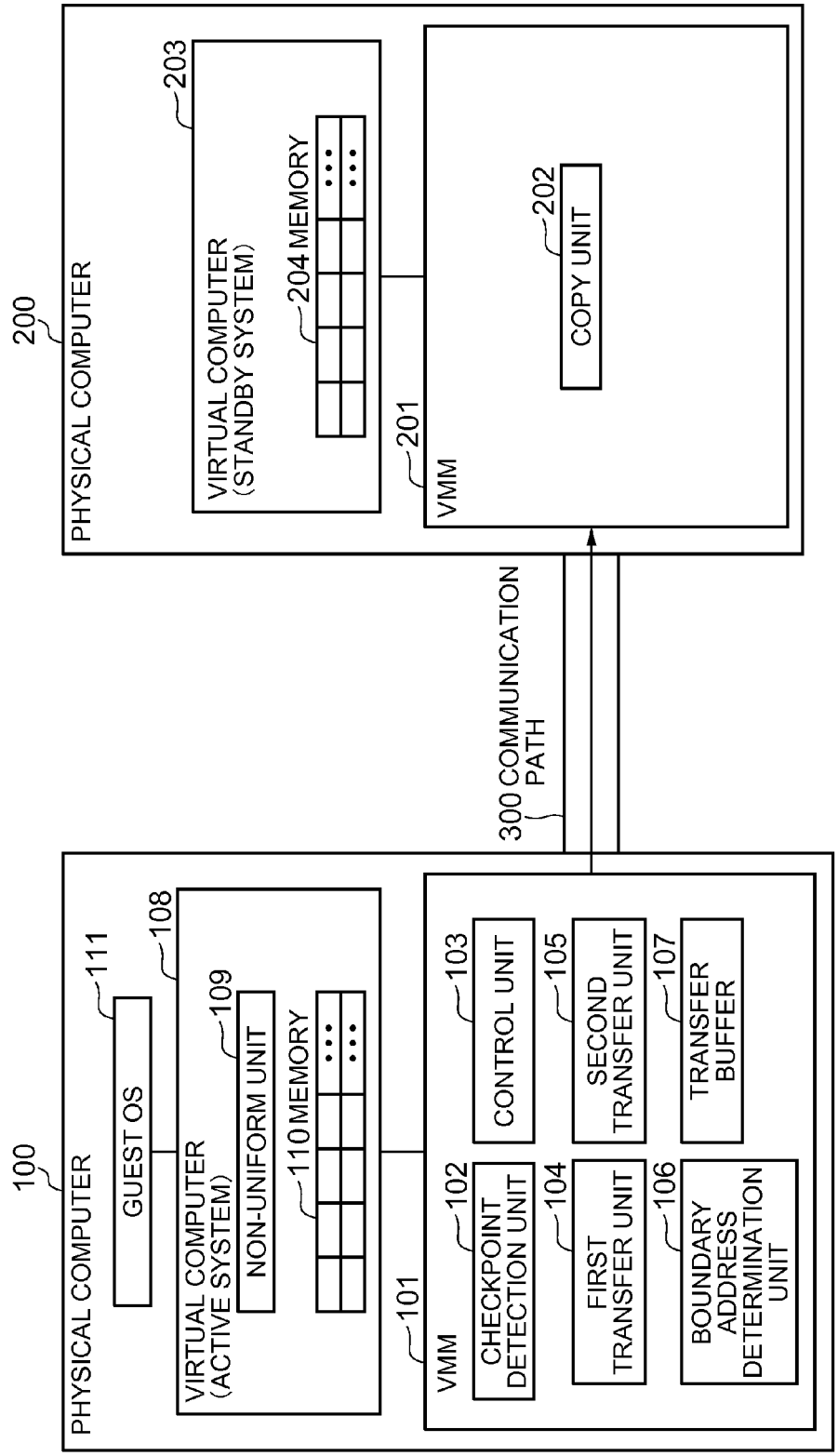
FIG. 1 is a block diagram showing an exemplary configuration of an FT server according to a first exemplary embodiment of the present invention.

Referring to FIG. 1, an FT server according to a first exemplary embodiment of the present invention includes a physical computer 100 and a physical computer 200 which are communicably connected with each other via a communication path 300.

The physical computer 100 includes a VMM 101 providing a virtual computer environment, a virtual computer 108 of an active system which operates under the virtual computer environment provided by the VMM 101, and a guest OS 111 which operates on the virtual computer 108. The physical computer 200 includes a VMM 201 providing a virtual computer environment, and a virtual computer 203 of a standby system which operates under the virtual computer environment provided by the VMM 201.

The guest OS 111 is an OS compatible with NUMA (Non-Uniform Memory Architecture). It should be noted that NUMA is an architecture in which an access distance (access cost) from a CPU to a memory is not uniform.

Figure 2:
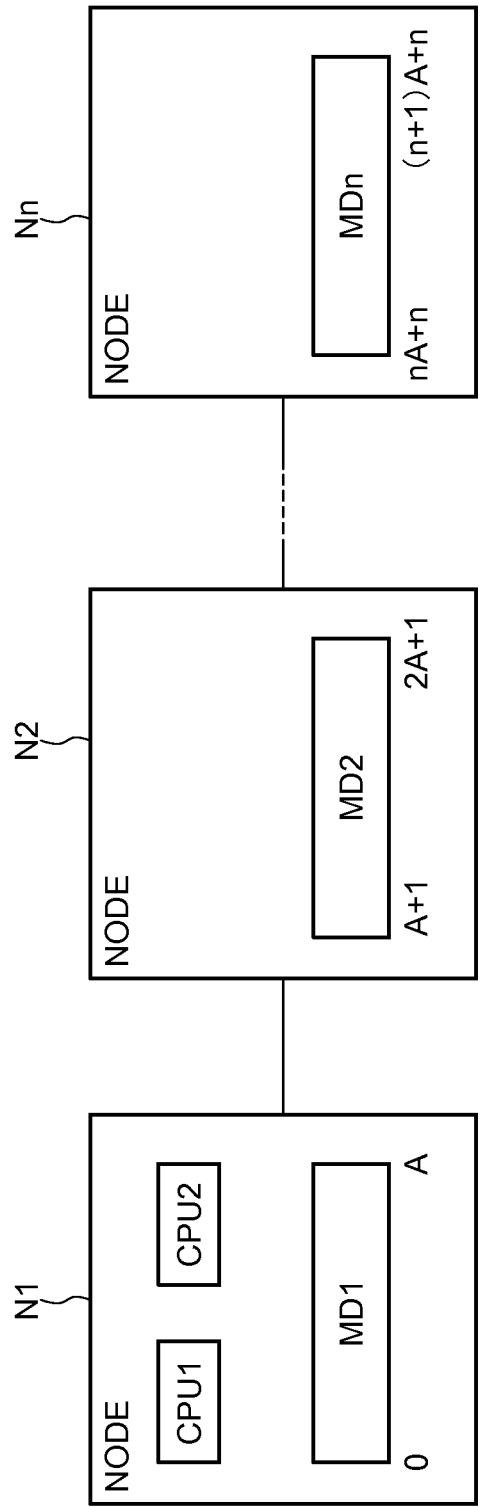
FIG. 2 is a diagram for explaining a non-uniform unit 109.

The virtual computer 108 includes a non-uniform unit 109 and a memory (guest physical memory) 110. The memory 110 is managed in units of a certain amount of capacity called a page (small region), and is configured of a plurality of pages. In this example, the physical computer 100 is configured of a plurality of nodes N1, N2, . . . , Nn as shown in FIG. 2, and respective memory regions MD1, MD2, . . . , MDn installed on the respective nodes collectively constitute the memory 110.

The non-uniform unit 109 has a function of giving an access distance, which is different from the actual distance, to the guest OS 111 so as to make the access distance from the CPU (virtual CPU) to the memory 110 look like non-uniform. For example, as shown in FIG. 2, if a CPU1 and a CPU 2 disposed on the node N1 are CPUs (virtual CPUs) of the virtual computer 108, it is made to look as if an access distance from the CPU1 and the CPU2 of the virtual computer 108 to the memory region MD1 (address "0~A") disposed on the same node N1 was the shortest, an access distance to the memory region MD2 (address "A+1~2A+1") arranged on the adjacent node N2 was the second shortest, and an access distance to the memory region MDn (address "nA+n~(n+1)A+n") arranged on the node Nn was the longest. It should be noted that in the present embodiment, a memory region having a shorter access distance has a smaller address value. Further, each of the memory regions MD1 to MDn is configured of a plurality of pages.

Figure 3:
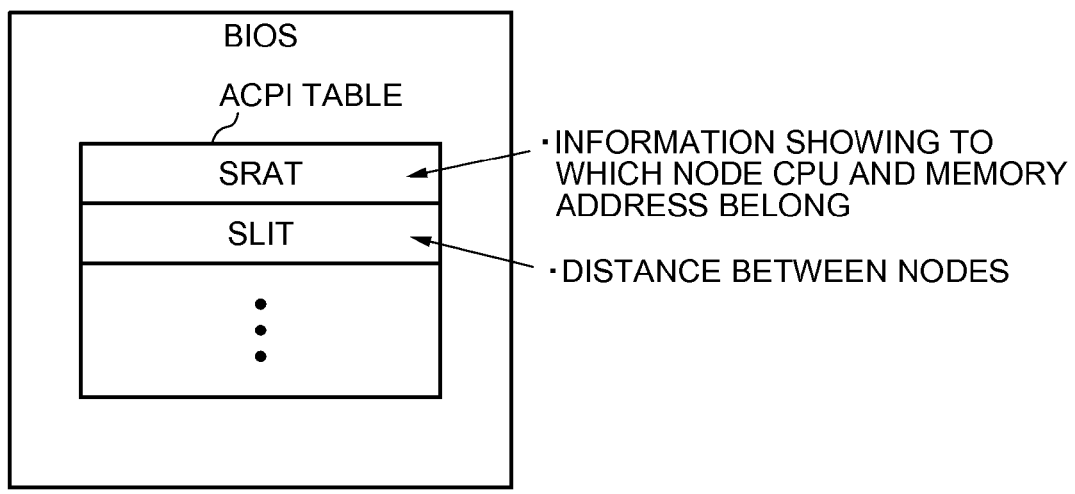
FIG. 3 is a diagram for explaining a method of implementing the non-uniform unit 109.

The non-uniform unit 109 having such a function is realized by a virtual BIOS (Basic Input Output System) on the virtual computer 108. More specifically, as shown in FIG. 3, in a SRAT (Static Resource Affinity Table) of an ACPI (Advanced Configuration and Power Interface) table in the BIOS, "information showing to which node CPU and memory address belong" is set, and a distance between nodes is set in an SLIT (System Locality Information Table). With these settings, it is possible to make the guest OS, compatible with NUMA, recognize that access distances from the CPUs to the memories are as shown in FIG. 2. Then, the guest OS compatible with NUMA attempts to dispose frequently-accessed data in a memory region of a short access distance, and dispose infrequently-accessed data in a memory region of a long access distance. Accordingly, a page having higher access frequency, including writing, are disposed in a memory region of a shorter access distance, that is, a memory region having a smaller address.

The VMM 101 includes a checkpoint detection unit 102, a control unit 103, a first transfer unit 104, a second transfer unit 105, a boundary address determination unit 106, and a transfer buffer 107.

The checkpoint detection unit 102 has a function of detecting a checkpoint which is timing of matching the memory content of the virtual computer 108 of the active system and the memory content of the virtual computer 203 of the standby system.

The control unit 103 has a function of suspending the virtual computer 108 when a checkpoint is detected by the checkpoint detection unit 102, a function of controlling the first and second transfer units 104 and 105, and the like.

The first transfer unit 104 has a function of transferring a dirty page in which the address thereof (e.g., initial address) is less than the boundary address (first group) determined by the boundary address determination unit 106, among the dirty pages which are pages on the memory 110 having been updated after the previous checkpoint, to the physical computer 200 by means of a bulk copy method in accordance with an instruction from the control unit 103.

The second transfer unit 105 has a function of transferring a dirty page in which the address thereof is not less than the boundary address (second group) among the dirty pages, to the physical computer 200 by means of a COW method in accordance with an instruction from the control unit 103.

The boundary address determination unit 106 has a function of determining a boundary address to be used for judging whether a dirty page is transferred by means of a bulk copy method or a COW method, based on the number of occurrences of page fault exceptions which is the case where a write request is made with respect to a dirty page in which writing is inhibited.

In the transfer buffer 107, a dirty page to be transferred to the physical computer 200 is stored temporarily.

It should be noted that the checkpoint detection unit 102, the control unit 103, the first transfer unit 104, the second transfer unit 105, the boundary address determination unit 106, and the non-uniform unit 109 are realized by causing a program, stored on a disk, a semiconductor memory, or another storage medium, to be read by a computer so as to control the operation of the computer in accordance with the program.

The virtual computer 203 on the physical computer 200 includes a memory 204. Further, the VMM 201 on the physical computer 200 has a copy unit 202. The copy unit 202 has a function of copying a dirty page, transmitted from the physical computer 100, to the memory 204 so as to match the content of the memory 204 with the content of the memory 110.

Figure 4:
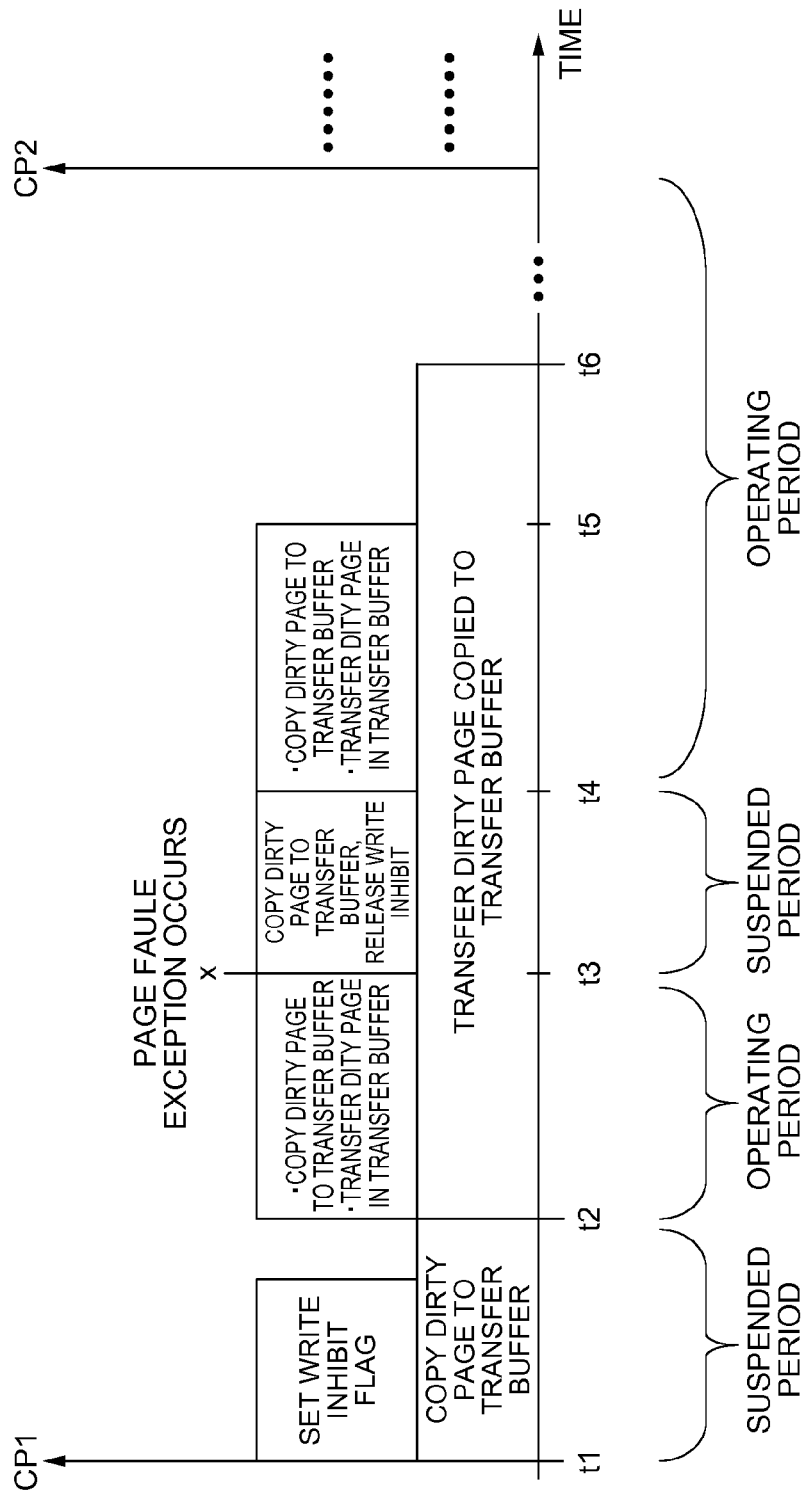
FIG. 4 is a sequence chart for explaining operations at the time of a checkpoint.

Next, operation of the present embodiment will be described in detail with reference to FIGS. 4 to 9. FIG. 4 is a sequence chart for explaining the operations at the time of a checkpoint, FIG. 5 is a flowchart showing exemplary processing of the control unit 103, FIG. 6 is a flowchart showing exemplary processing of the first transfer unit 104, FIG. 7 is a flowchart showing exemplary processing of the second transfer unit 105, FIG. 8 is a diagram showing a relationship between memory regions and methods of transferring dirty pages (bulk copy method, COW method), and FIG. 9 is a flowchart showing exemplary processing of the boundary address determination unit 106.

As shown in FIG. 4, at a time t1, it is assumed that the checkpoint detection unit 102 in the physical computer 100, on which the virtual computer 108 of the active system operates, detects a checkpoint CP1.

Figure 5:
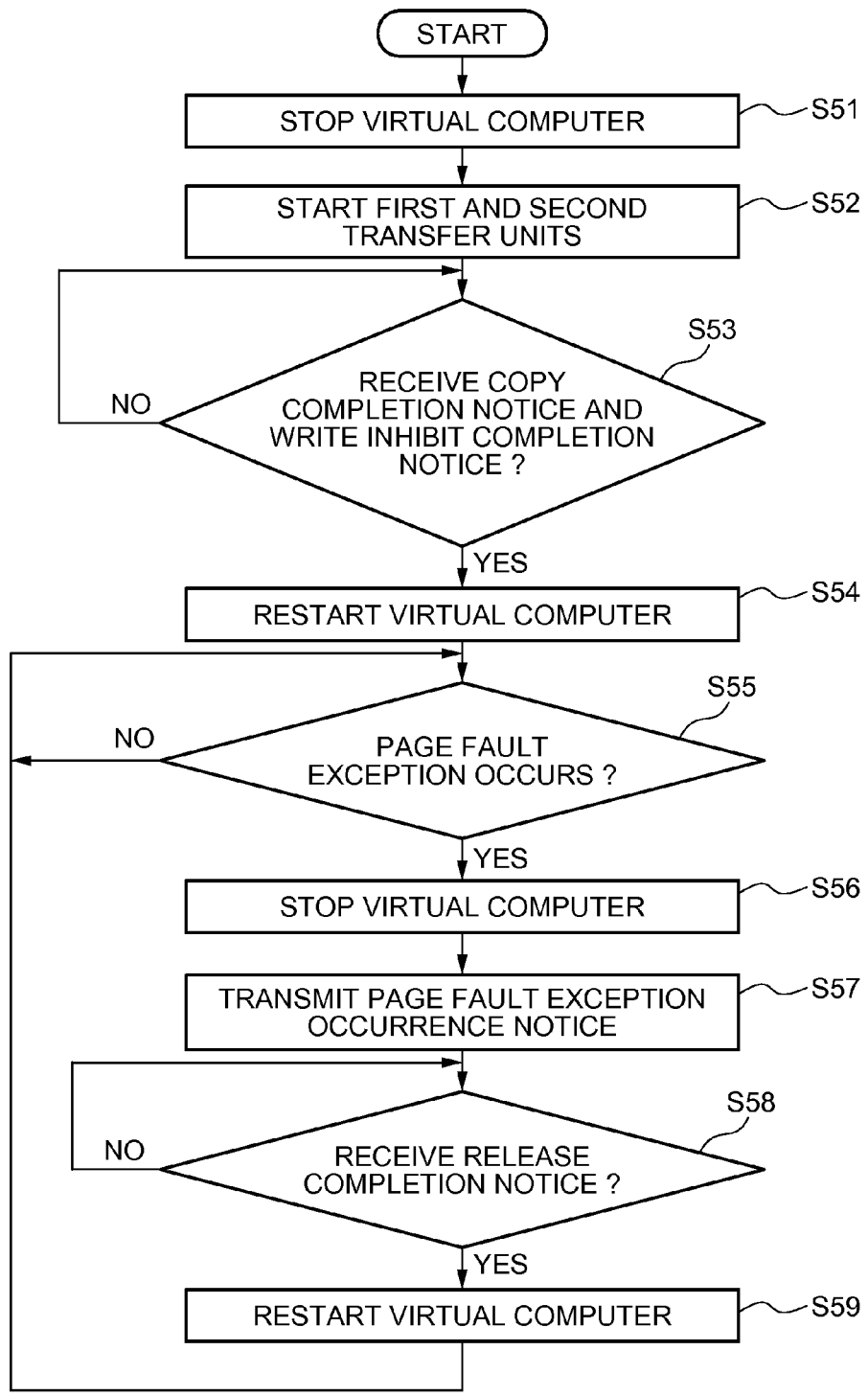
FIG. 5 is a flowchart showing exemplary processing of a control unit 103.

When the checkpoint detection unit 102 detect the checkpoint CP1 detects at the time t1, the control unit 103 suspends the virtual computer 108 of the active system as shown in the flowchart of FIG. 5 (step S51). Then, the control unit 103 activates the first and second transfer units 104 and 105, and waits for a copy completion notice and a write inhibit completion notice from the transfer units 104 and 105 (steps S52, S53).

Figure 6:
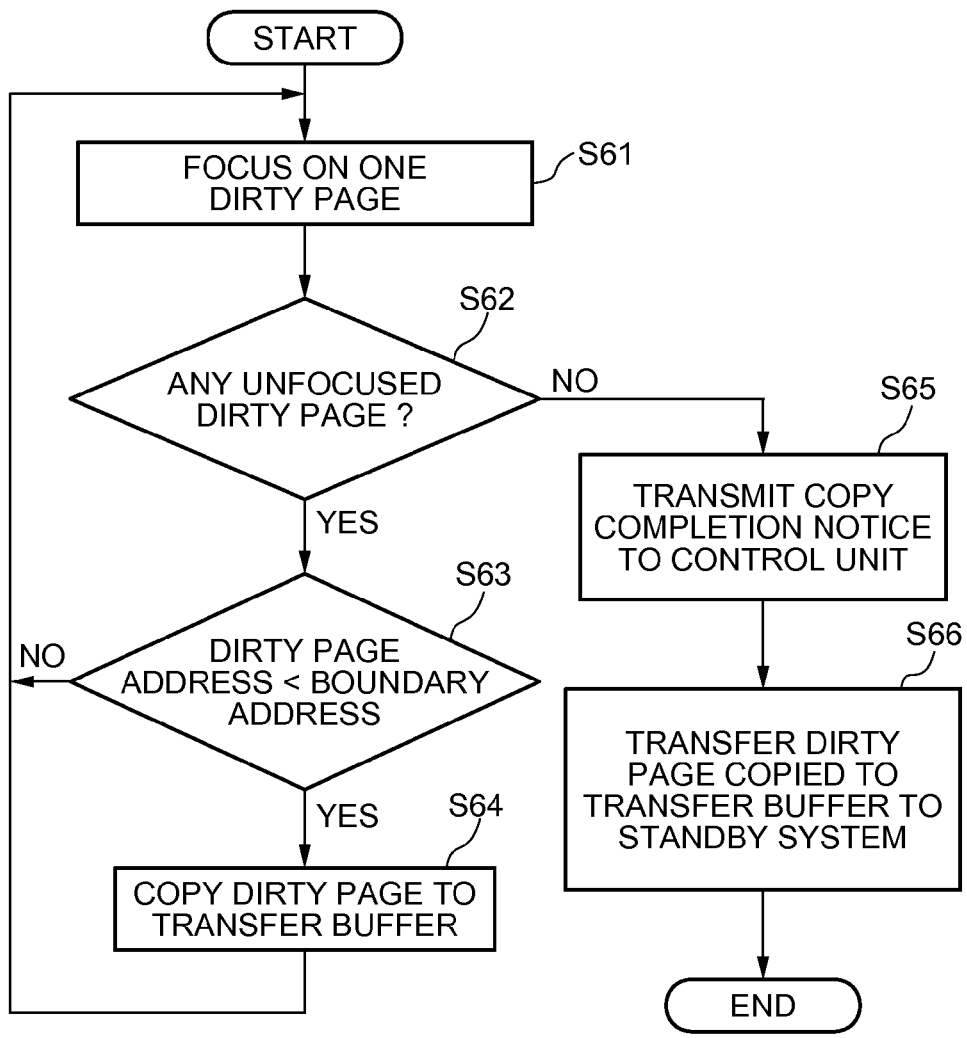
FIG. 6 is a flowchart showing exemplary processing of a first transfer unit 104.
Figure 7:
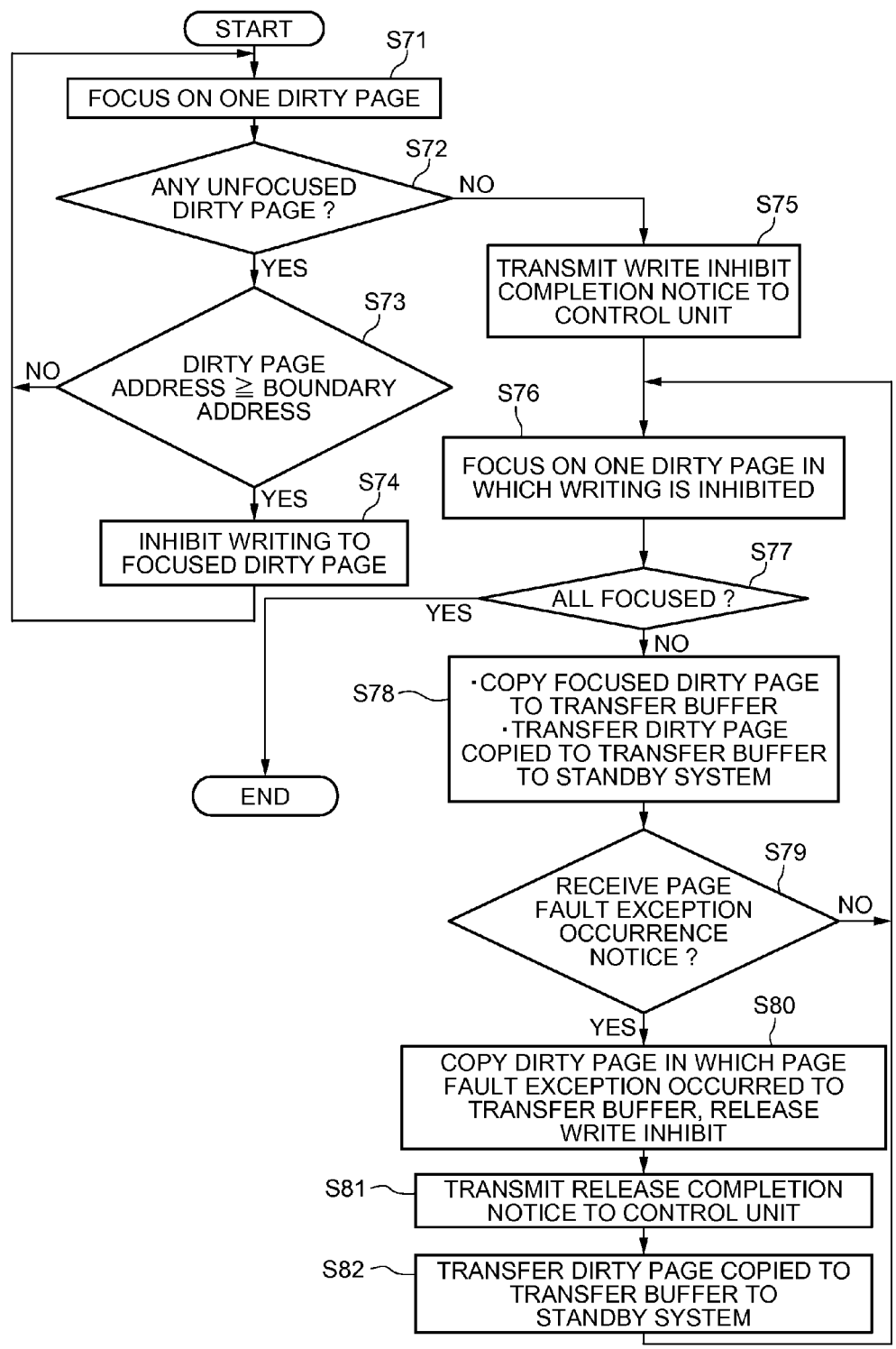
FIG. 7 is a flowchart showing exemplary processing of a second transfer unit 105.
Figure 8:
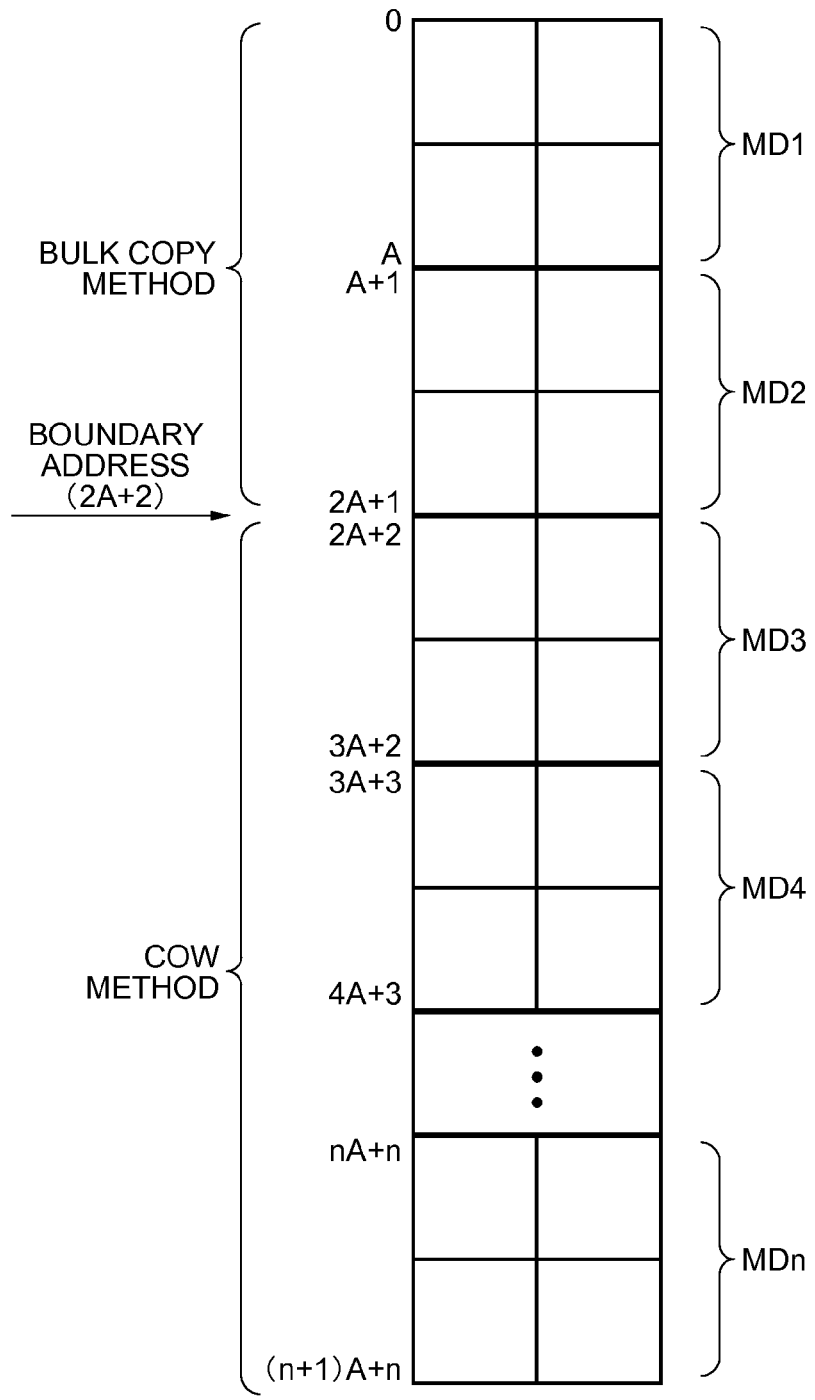
FIG. 8 is a diagram showing a relation between memory regions and methods of transferring dirty pages.

Thereby, the first and second transfer units 104 and 105 perform processing according to the flowcharts of FIGS. 6 and 7, respectively.

When activated by the control unit 103, the first transfer unit 104 focuses on one dirty page, and judges whether or not the address of the dirty page is less than the boundary address determined by the boundary address determination unit 106, as shown in the flowchart of FIG. 6 (steps S61 and S63). Then, if the address of the dirty page is less than the boundary address, as the dirty page is to be copied by means of a bulk copy method, the first transfer unit 104 copies the page to the transfer buffer 107 (Yes at step S63, and step S64). On the contrary, if the address of the dirty page is not less than the boundary address, the first transfer unit 104 focuses on the next dirty page (No at step S63, and step S61).

For example, as shown in FIG. 8, if the boundary address is "2A+2", in the case of a dirty page on the memory region MD1 or MD2, the first transfer unit 104 copies the page to the transfer buffer 107. This means that a dirty page, on the memory region MD1 or MD2 having a short access distance from the CPU1 or the CPU2 which are frequently accessed, is determined that the write frequency is high, so that the page is copied to the transfer buffer 107 so as to be transferred in a bulk copy method.

When the first transfer unit 104 completed the above-described processing with respect to all of the dirty pages (No at step S62), the first transfer unit 104 transmits a copy completion notice to the control unit 103 (step S65).

On the other hand, when the second transfer unit 105 is activated by the control unit 103, the second transfer unit 105 focuses on one dirty page, and judges whether or not the address of the dirty page is not less than the boundary address determined by the boundary address determination unit 106, as shown in the flowchart of FIG. 7 (steps S71, S73). Then, if the address of the dirty page is not less than the boundary address, as the dirty page is to be transferred by means of a COW method, the second transfer unit 105 sets a write inhibit flag to an entry corresponding to the dirty page in the page table (not shown) so as to inhibit writing to the dirty page, for example (Yes at step S73, step S74). On the contrary, if the address of the dirty page is less than the boundary address, the second transfer unit 105 focuses on the next dirty page (No at step S73, step S71).

For example, as shown in FIG. 8, if the boundary address is "2A+2", writing to dirty pages on the memory regions MD3 to MDn is inhibited. This means that dirty pages having a long access distance from the CPU and low access frequency, are determined that write frequency is low, whereby writing to such dirty pages is inhibited so as to transfer the dirty pages by means of a COW method.

When the second transfer unit 105 completes the above-described processing with respect to all of the dirty pages (No at step S72), the second transfer unit 105 transmits a write inhibit completion notice to the control unit 103.

When the control unit 103 receives both the copy completion notice from the first transfer unit 104 and the write inhibit completion notice from the second transfer unit 105 (Yes at step S53 in FIG. 5), the control unit 103 restarts the virtual computer 108 (step S54, time t2 in FIG. 4).

When the second transfer unit 105 completes the processing at step S75, the second transfer unit 105 focuses on one dirty page in which writing is inhibited (step S76), copies the dirty page to the transfer buffer 107, and release the write inhibit (step S78). Further, at step S78, the second transfer unit 105 transfers the dirty page, copied to the transfer buffer 107, to the physical computer 200, if possible. The copy unit 202 of the physical computer 200 copies the dirty page, transferred from the physical computer 100, to the memory 204.

Here, as the dirty page transferred by the second transfer unit 105 is a dirty page having low write frequency, the frequency of occurrence of a page fault exception is low. However, if a page fault exception, which is a writing request to a dirty page in which writing is inhibited, occurs, the following processing is performed.

When the control unit 103 detects that a page fault exception occurs at a time t3 (see FIG. 4) (Yes at step S55 in FIG. 5), the control unit 103 suspends the virtual computer 108 (step S56). Then, the control unit 103 transmits a page fault exception occurrence notice to the second transfer unit 105, and waits for a release completion notice which will be transmitted from the second transfer unit 105 (steps S57, S58).

When the second transfer unit 105 receives the page fault exception occurrence notice (Yes at step S79 in FIG. 7), the second transfer unit 105 copies the page, in which the page fault exception has occurred, to the transfer buffer 107, and upon completion of the copying, releases write inhibit of the dirty page (step S80). Then, the second transfer unit 105 transmits a release notice showing that write inhibit has been released, to the control unit 103 (step S81). Upon receipt of the inhibit release notice (step S58 at FIG. 5), the control unit 103 restarts the virtual computer 108 (step S59, a time t4 in FIG. 4), and then performs processing of step S55 again.

After transmitting the release completion notice, the second transfer unit 105 transmits the dirty page copied to the transfer buffer 107, in which the page fault exception has occurred, to the physical computer 200 (step S82), and performs processing of step S76 again. Then, after performing the above-described processing on all of the dirty pages in which writing is inhibited (Yes at step S77), the second transfer unit 105 ends the processing.

On the other hand, after completion of the processing of step S65, the first transfer unit 104 transfers the dirty page, copied to the transfer buffer 107, to the physical computer 200 (step S66, times t2 to t6 in FIG. 4).

Next, operation of the boundary address determination unit 106 will be described with reference to the flowcharts of FIGS. 9(A) and 9(B).

Each time a checkpoint is detected by the checkpoint detection unit 102, the boundary address determination unit 106 counts the number of times a page fault exception occurs during the time until the next checkpoint is detected in a memory region having the smallest address among the memory regions (second group) to which a COW method is applied, and stores the count value in the exception occurrence number storing unit (not shown) (step S91). For example, in the case where the boundary address is "2A+2" as shown in FIG. 8, the boundary address determination unit 106 counts the number of page fault occurred in the memory area MD3, and stores the count value in the exception occurrence number storing unit.

Further, each time checkpoints are detected M number of times (M is one or larger, determined according to the operating environment) by the checkpoint detection unit 102, the boundary address determination unit 106 performs processing shown in the flowchart of FIG. 9(B).

The boundary address determination unit 106 first judges whether or not all of the number of occurrences of a page fault exception, for the past M number of times (latest M number of times) stored in the exception occurrence number storing unit, exceed an upper limit threshold Thmax (step S92). It should be noted that the upper limit threshold Thmax is determined based on a maximum value of the number of occurrences of a page fault exception in which transferring a dirty page by the COW method can reduce the suspended period of the virtual computer 108, compared with the case of transferring the dirty page by a bulk copy method (calculated by actually running the FT server). For example, the upper limit threshold Thmax may be a value larger by a predetermined value than the actually obtained maximum value.

Then, if the number of occurrences of a page fault exception exceeds the upper limit threshold Thmax (Yes at step S92), the boundary address determination unit 106 changes the boundary address to the address of the following memory region (e.g., initial address) (step S94). For example, if the memory region having the smallest address among the memory regions to which the COW method is applied is the memory region MD3 as shown in FIG. 8, the boundary address is changes to the initial address "3A+3" of the memory region MD4. Here, the fact that the number of occurrences of a page fault exception in the memory region MD3 exceeds the upper limit threshold Thmax means that if a dirty page in the memory region MD3 is transferred by the COW method, the suspended period of the virtual computer 108 becomes longer compared with the case of transferring it by the bulk copy method. As such, in order to make the dirty page of the memory region MD3 be transferred by the bulk copy method, the boundary address is changed to the address of the memory region MD4.

On the contrary, if the number of occurrences of a page fault exception does not exceed the upper limit threshold Thmax (No at step S92), the boundary address determination unit 106 judges whether or not every number of occurrences of a page fault exception for the past M times stored in the exception occurrence number storing unit is less than a lower limit threshold Thmin (Thmin<Thmax) (step S93). It should be noted that the lower limit value Thmin is determined based on a maximum value of the number of occurrences of a page fault exception in which transferring a dirty page by the COW method can reduce the suspended period of the virtual computer 108, compared with the case of transferring the dirty page by a bulk copy method (calculated by actually running the FT server). For example, the lower limit threshold Thmin may be a value smaller by a predetermined value than the actually obtained maximum value.

Then, if the number of occurrences of a page fault exception is not less than the lower limit threshold Thmin (No at step S93), the boundary address determination unit 106 ends the processing. On the other hand, if the number of occurrences of a page fault exception is less than the lower limit threshold Thmin (Yes at step S93), the boundary address determination unit 106 changes the boundary address to the address of the previous memory region (step S95). For example, if the memory region having the smallest address among the memory regions to which the COW method is applied is the memory region MD3 as shown in FIG. 8, the boundary address is changes to the address "A+1" of the memory region MD2. Here, the fact that the number of occurrences of a page fault exception is less than the lower limit threshold Thmin means that if a dirty page in the memory region MD2, having a second shortest access distance after the access distance of the memory region MD3, is transferred by the COW method, the suspended period of the virtual computer 108 may be shorter compared with the case of transferring it by the bulk copy method. As such, in order to make the dirty page of the memory region MD3 be transferred by the COW method, the boundary address is changed to the address of the memory region MD2.

It should be noted that in the above-described embodiment, although which of a bulk copy method or a COW method is used as a dirty page transfer method is determined based on a comparison result between the boundary address and the address of a dirty page, it is possible to determine the dirty page transfer method based on a comparison result of the access distance (boundary access distance) and the access distance of the memory region to which the dirty page belongs. For example, it is only necessary that if the access distances of the memory regions MD1, MD2, MD3, . . . , MDn shown in FIG. 8 are 1, 2, 3, . . . , n, respectively, dirty pages on the memory regions MD1 and MD2 are copied by a bulk copy method, and if dirty pages on the memory regions MD3 to MDn are to be transferred by a COW method, the boundary access distance is set to "3", and dirty pages on a memory region having an access distance less than the boundary access distance are transferred by a bulk copy method, and dirty pages on a memory region having an access distance not less than the boundary access distance are transferred by a COW method. Further, as a physical computer, a computer of NUMA architecture can be applied, of course. Further, although in the above description the second transfer unit 105 first copies a dirty page to the transfer buffer 107 and then transfers it to the physical computer 200, it is possible to directly transfer a dirty page on the memory to the physical computer 200 without through the transfer buffer 107.

Effects of First Exemplary Embodiment

The present embodiment is able to achieve an advantageous effect that the suspended period of a virtual computer of the active system is reduced compared with the case of using only a COW method or a bulk copy method. This is because the present embodiment is configured such that a dirty page having high write frequency is transferred by a bulk copy method and a dirty page having low write frequency is transferred by a COW method.

Further, the present embodiment is also able to achieve an advantageous effect that an appropriate boundary address is used for judging whether a dirty page is transferred by a bulk copy method or a COW method. This is because the present embodiment is configured such that the boundary address is changed based on the number of occurrences of page fault.

Second Exemplary Embodiment

Next, an FT server according to a second exemplary embodiment of the present invention will be described.

Figure 10:
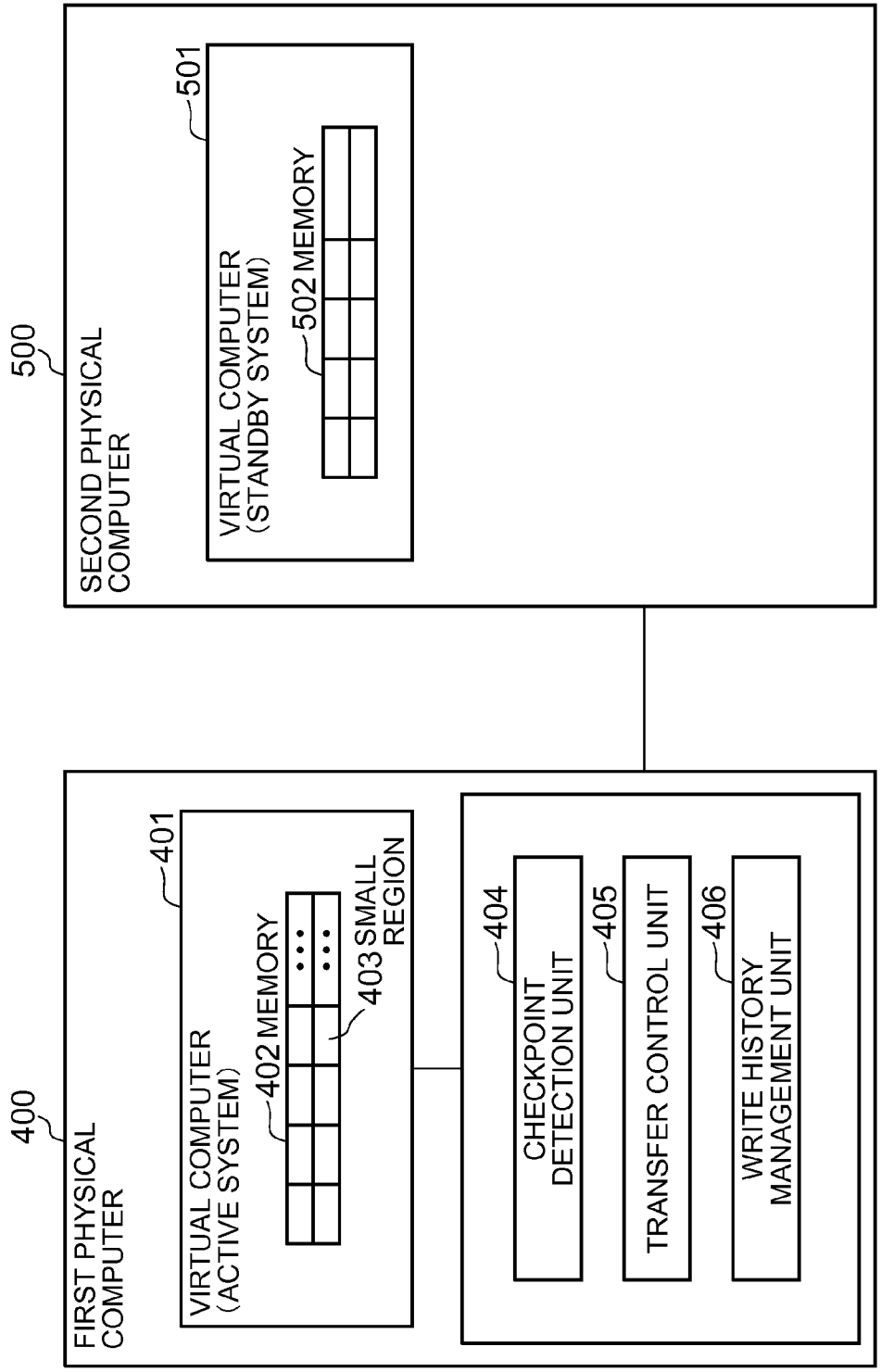
FIG. 10 is a block diagram showing an exemplary configuration of an FT server according to a second exemplary embodiment of the present invention.

Referring to FIG. 10, an FT server according to the present embodiment includes a first physical computer 400 on which a virtual computer 401 of the active system operates and a second physical computer 500 on which a virtual computer 501 of the standby system operates.

The virtual computer 401 of the active system includes a memory 402 configured of a plurality of small regions 403 grouped in a first group, and a plurality of small regions 403 grouped in a second group. The small region 403 may be a page or a segment.

A write history management unit 406 manages write frequency of each of the small regions 403. In the present embodiment, the small regions 403 in which the write frequency managed by the write history management unit 406 is higher than a threshold are grouped in the first group, and the small regions 403 in which the write frequency is less than the threshold are grouped in the second group.

A transfer control unit 405 performs first to third processing shown below.

First Processing

Processing to, when a checkpoint is detected by a checkpoint detection unit 404, suspend the virtual computer 401 of the active system, copy, to a transfer buffer (not shown), data of the small regions 403 in the first group among the small regions 403 in the memory 402 having been updated after the previous checkpoint, and after inhibiting writing to the small regions in to the second group, restart the virtual computer of the active system.

Second Processing

Processing to copy the data of the small regions 403, in which writing is inhibited, to the transfer buffer and release the write inhibit, and transfer the data of the small regions copied to the transfer buffer to the second physical computer 500.

Third Processing

Processing to, if a write request is generated (page fault exception occurs) with respect to the small regions in which writing is inhibited, suspend the virtual computer 401 of the active system, copy the data of the small regions 403, in which the write request has been generated, to the transfer buffer, and then restart the virtual computer 401 of the active system and transfer the copied data of the small regions, to which the write request has been generated, to the second physical computer 500.

The second physical computer 500 copies the data transmitted from the first physical computer 400 to a memory 502 to thereby match the contents of the memories 402 and 504.

Effects of Second Exemplary Embodiment

The present embodiment is able to achieve an advantageous effect that the suspended period of the virtual computer of the active system is recued. This is because the present embodiment is configured such that the memory contents of the active system and the standby system are matched by using different methods between the small regions of the memory having low write frequency and for the small regions of the memory having high write frequency.

Third Exemplary Embodiment

Next, an FT server according to a third exemplary embodiment of the present invention will be described.

Figure 11:
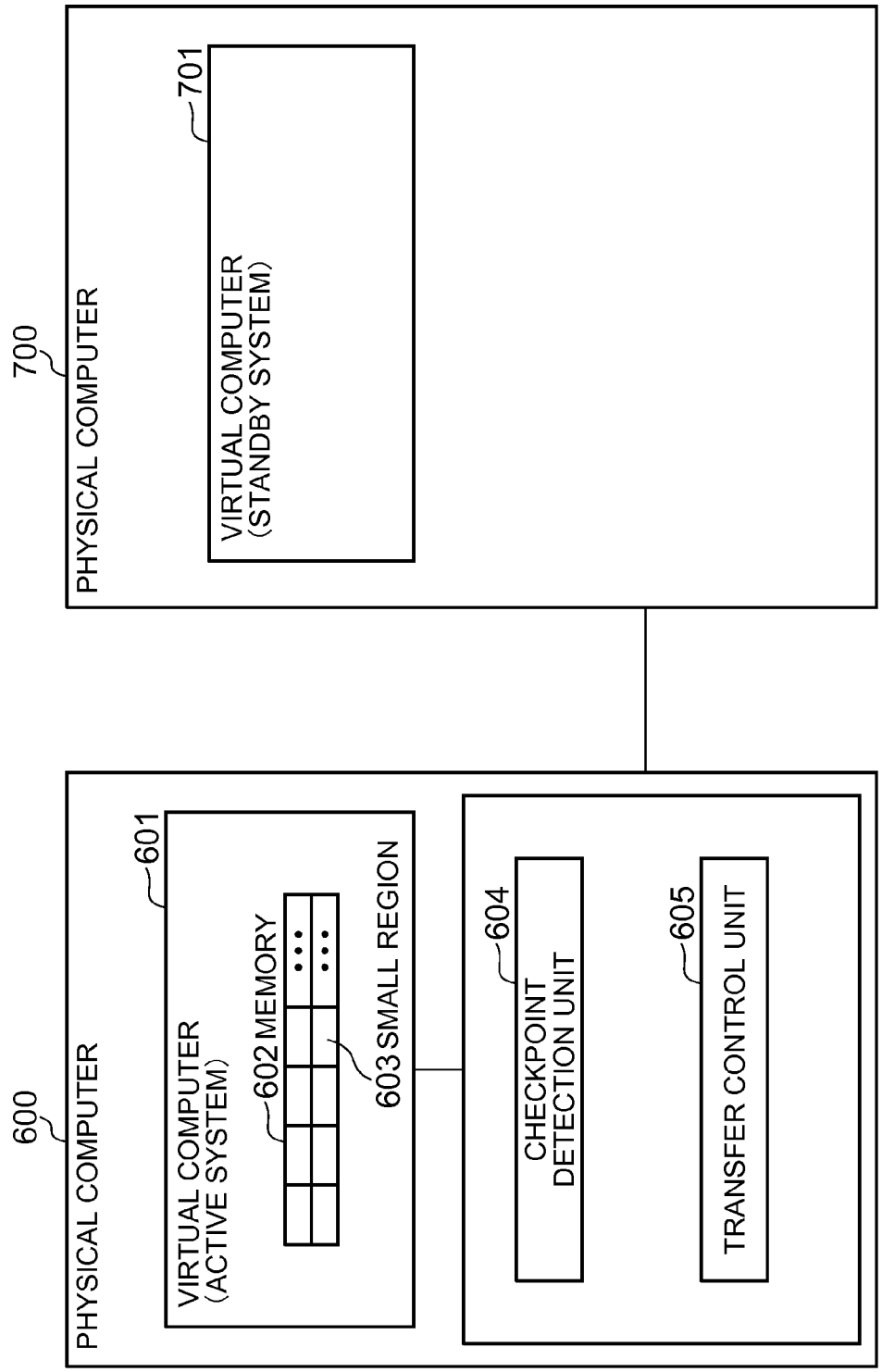
FIG. 11 is a block diagram showing an exemplary configuration of an FT server according to a second exemplary embodiment of the present invention.
Figure 12:
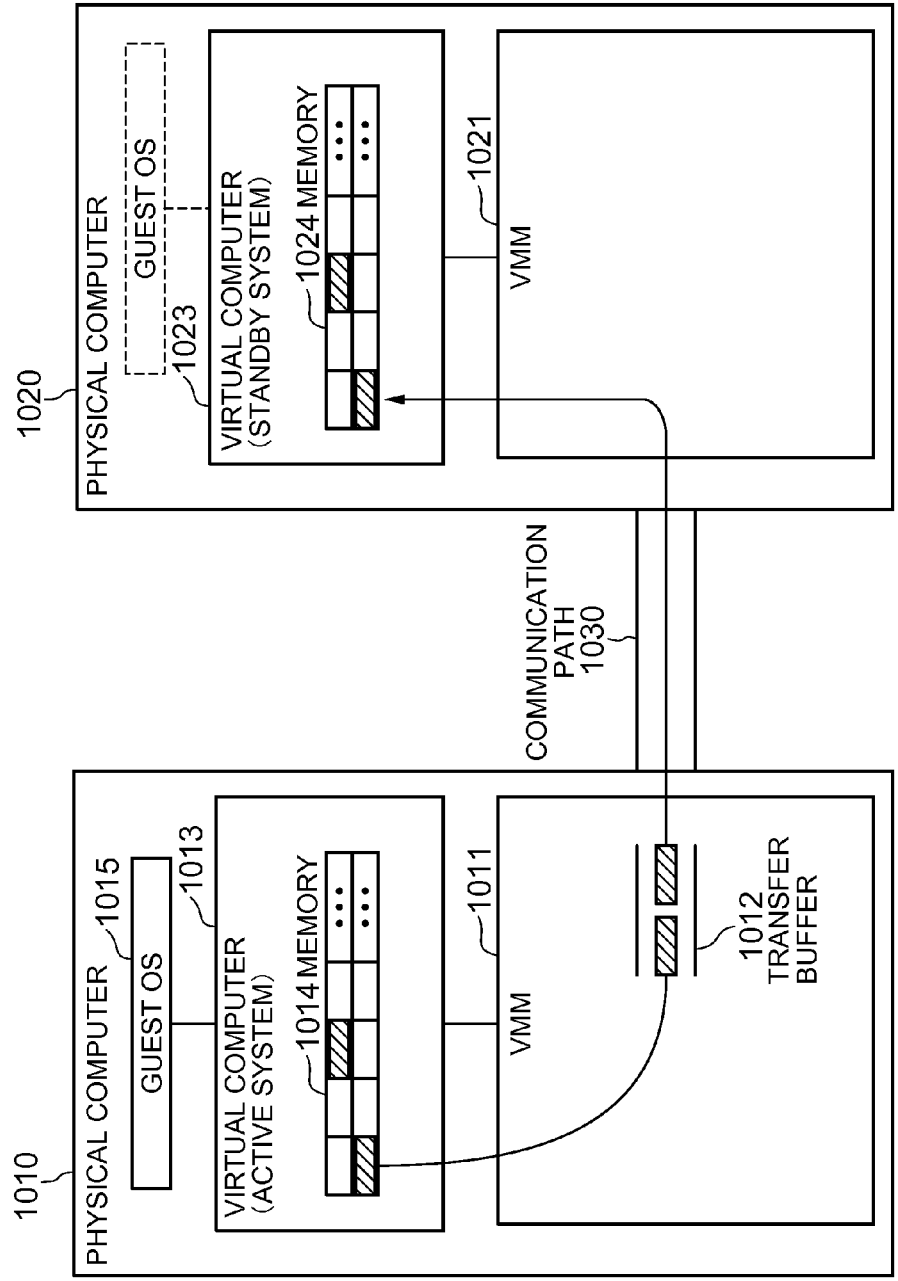
FIG. 12 is a block diagram for explaining a software-based FT server.

Referring to FIG. 11, the FT server of the present embodiment includes a first physical computer 600 on which a virtual computer 601 of the active system operates, and a second physical computer 700 on which a virtual computer 701 of the standby system operates.

The virtual computer 601 of the active system includes a memory 602 configured of a plurality of small regions 603 grouped in a first group, and a plurality of small regions 603 grouped in a second group. The small region 603 may be a page or a segment.

A transfer control unit 605 performs first and second processing shown below.

First Processing

Processing to, when a checkpoint is detected by a checkpoint detection unit 604, suspend the virtual computer 601 of the active system, copy, to a transfer buffer (not shown), data of the small regions 603 in the first group among the small regions 603 in the memory 602 having been updated after the previous checkpoint, and after inhibiting writing to the small regions in the second group, restart the virtual computer of the active system.

Second Processing

Processing to copy the data of the small regions 603, in which writing is inhibited, to the transfer buffer and release the write inhibit, and transfer the data of the small regions, copied to the transfer buffer, to the second physical computer 700.

Effects of Third Exemplary Embodiment

The present embodiment is able to achieve an advantageous effect that the suspended period of the virtual computer of the active system is reduced. This is because the present embodiment is configured such that the small regions constituting the memory is divided into the first group and the second group, and the memory contents of the active system and the standby system are matched by using different methods between the respective groups.

Supplementary Notes

The whole or part of the exemplary embodiments disclosed above can be described as, but not limited to, the following supplementary notes. Hereinafter, the outline of the configuration of the present invention will be described. However, the present invention is not limited to the configurations described below.

(Supplementary Note 1)

A fault tolerant server comprising:

a first physical computer on which a virtual computer of an active system operates; and a second physical computer on which a virtual computer of a standby system operates, wherein the virtual computer of the active system includes a memory including a plurality of small regions grouped in a first group and a plurality of small regions grouped in a second group, the first physical computer includes:
  a checkpoint detection unit that detects a checkpoint; and
  a transfer control unit that performs first processing and second processing, the first processing including, when a checkpoint is detected by the checkpoint detection unit, suspending the virtual computer of the active system, copying, to a transfer buffer, data of the small regions in the first group among the small regions of the memory having been updated after a previous checkpoint, and after inhibiting writing to the small regions in the second group, restarting the virtual computer of the active system, the second processing including copying data of the small regions, in which writing is inhibited, to the transfer buffer and releasing write inhibit, and transferring the data of the small regions, having been copied to the transfer buffer, to the second physical computer.

(Supplementary Note 2)

The fault tolerant server according to supplementary note 1, wherein
  if a write request with respect to a small regions, in which writing is inhibited, is generated, the transfer control unit performs processing to suspend the virtual computer of the active system, copy the data of the small region, in which the write request is generated, to the transfer buffer, and then restart the virtual computer of the active system and transfer the data of the small region in which the write request is generated, the data having been copied to the transfer buffer, to the second physical computer.

(Supplementary Note 3)

The fault tolerant server according to supplementary note 1, further comprising
  a non-uniform unit that makes a guest OS, operating on the virtual computer of the active system, believe that access distances to memory regions including the small regions are non-uniform, wherein
  the small regions in the first group are small regions on the memory regions each having an access distance less than an access distance threshold, and
  the small regions in the second group are small regions on the memory regions each having an access distance not less than the access distance threshold.

(Supplementary Note 4)

The fault tolerant server according to supplementary note 1, further comprising
  a non-uniform unit that makes a guest OS, operating on the virtual computer of the active system, believe that access distances of memory regions, including the small regions, are non-uniform, wherein
  the small regions in the first group are small regions each having an address less than a boundary address, and
  the small regions in the second group are small regions each having an address not less than the boundary address.

(Supplementary Note 5)

The fault tolerant server according to supplementary note 4, further comprising
  a boundary address determination unit that if the number of occurrences of a page fault exception in a memory region, in which an initial address is the boundary address, exceeds an upper limit threshold, changes the boundary address to an initial address of a memory region having a shortest access distance among the memory regions having access distances longer than an access distance of the memory region in which the initial address is the boundary address, and that if the number of occurrences of a page fault exception is less than a lower limit threshold, changes the boundary address to an initial address of a memory region having a longest access distance among the memory regions having access distances shorter than the access distance of the memory region in which the initial address is the boundary address.

(Supplementary Note 6)

The fault tolerant server according to supplementary note 1, further comprising
  a write history management unit that manages frequency of writing to each of the small regions, wherein
  the small regions in the first group are small regions in each of which the frequency of writing managed by the write history management unit is not less than a threshold, and
  the small regions in the second group are small regions in each of which the frequency of writing managed by the write history management unit is less than the threshold.

(Supplementary Note 7)

A physical computer on which a virtual computer of an active system operates, the virtual computer including a memory including a plurality of small regions grouped in a first group and a plurality of small regions grouped in a second group, the physical computer comprising:
  a checkpoint detection unit that detects a checkpoint; and
  a transfer control unit that performs first processing and second processing, the first processing including, when a checkpoint is detected by the checkpoint detection unit, suspending the virtual computer of the active system, copying, to a transfer buffer, data of the small regions in the first group among the small regions of the memory having been updated after a previous checkpoint, and after inhibiting writing to the small regions in the second group, restarting the virtual computer of the active system, the second processing including copying data of the small regions, in which writing is inhibited, to the transfer buffer and releasing write inhibit, and transferring the data of the small regions, having been copied to the transfer buffer, to the second physical computer.

(Supplementary Note 8)

A transfer method implemented by a computer including a virtual computer of an active system, a checkpoint detection unit, and a transfer control unit, the virtual computer including a memory including a plurality of small regions grouped in a first group and a plurality of small regions grouped in a second group, the method comprising:
  by the checkpoint detection unit, detecting a checkpoint; and
  by the transfer control unit, performing first processing and second processing, the first processing including, when a checkpoint is detected by the checkpoint detection unit, suspending the virtual computer of the active system, copying, to a transfer buffer, data of the small regions in the first group among the small regions of the memory having been updated after a previous checkpoint, and after inhibiting writing to the small regions in the second group, restarting the virtual computer of the active system, the second processing including copying data of the small regions, in which writing is inhibited, to the transfer buffer and releasing write inhibit, and transferring the data of the small regions, having been copied to the transfer buffer, to the second physical computer.

(Supplementary Note 9)

A program for causing a computer, on which a virtual computer of an active system operates, to function as, the virtual computer including a memory including a plurality of small regions grouped in a first group and a plurality of small regions grouped in a second group:
  a checkpoint detection unit that detects a checkpoint; and
  a transfer control unit that performs first processing and second processing, the first processing including, when a checkpoint is detected by the checkpoint detection unit, suspending the virtual computer of the active system, copying, to a transfer buffer, data of the small regions in the first group among the small regions of the memory having been updated after a previous checkpoint, and after inhibiting writing to the small regions in the second group, restarting the virtual computer of the active system, the second processing including copying data of the small regions, in which writing is inhibited, to the transfer buffer and releasing write inhibit, and transferring the data of the small regions, having been copied to the transfer buffer, to the second physical computer.

It should be noted that the program described above may be stored on a storage device or a computer-readable storage medium. For example, a storage medium is a portable medium such as a flexible disk, an optical disk, a magneto-optical disk, a semiconductor memory, or the like.

While the present invention has been described with reference to the exemplary embodiments described above, the present invention is not limited to the above-described embodiments. The form and details of the present invention can be changed within the scope of the present invention in various manners that can be understood by those skilled in the art.

INDUSTRIAL APPLICABILITY

The present invention is applicable to a software-based FT server in which the memory content of a virtual computer is copied to a memory of another virtual computer. Further, the present invention is also applicable to a cluster system or live migration processing of a virtual computer.

The invention claimed is:

1. A fault tolerant server comprising:
a first physical computer on which a virtual computer of an active system operates; and
a second physical computer on which a virtual computer of a standby system operates, wherein
the virtual computer of the active system includes a memory including a plurality of small regions grouped in a first group and a plurality of small regions grouped in a second group,
the first physical computer includes:
a checkpoint detection unit that detects a checkpoint; and
a transfer control unit that performs first processing and second processing, the first processing including, when a checkpoint is detected by the checkpoint detection unit, suspending the virtual computer of the active system, copying, to a transfer buffer, data of the small regions in the first group among the small regions of the memory having been updated after a previous checkpoint, and after inhibiting writing to the small regions in the second group, restarting the virtual computer of the active system, the second processing including copying data of the small regions, in which writing is inhibited, to the transfer buffer and releasing write inhibit, and transferring the data of the small regions, having been copied to the transfer buffer, to the second physical computer; and
a non-uniform unit that makes a guest OS, operating on the virtual computer of the active system, believe that access distances to memory regions including the small regions are non-uniform, wherein
the small regions in the first group are small regions on the memory regions each having an access distance less than an access distance threshold, and
the small regions in the second group are small regions on the memory regions each having an access distance not less than the access distance threshold.

2. The fault tolerant server according to claim 1, wherein if a write request with respect to a small region, in which writing is inhibited, is generated, the transfer control unit performs processing to suspend the virtual computer of the active system, copy the data of the small region, in which the write request is generated, to the transfer buffer, and then restart the virtual computer of the active system and transfer the data of the small region in which the write request is generated, the data having been copied to the transfer buffer, to the second physical computer.

3. The fault tolerant server according to claim 1, further comprising
a non-uniform unit that makes a guest OS, operating on the virtual computer of the active system, believe that access distances of memory regions, including the small regions, are non-uniform, wherein
the small regions in the first group are small regions each having an address less than a 20 boundary address, and
the small regions in the second group are small regions each having an address not less than the boundary address.

4. The fault tolerant server according to claim 3, further comprising
a boundary address determination unit that if the number of occurrences of a page fault exception in a memory region, in which an initial address is the boundary address, exceeds an upper limit threshold, changes the boundary address to an initial address of a memory region having a shortest access distance among the memory regions having access distances longer than an access distance of the memory region in which the initial address is the boundary address, and that if the number of occurrences of a page fault exception is less than a lower limit threshold, changes the boundary address to an initial address of a memory region having a longest access distance among the memory regions having access distances shorter than the access distance of the memory region in which the initial address is the boundary address.

5. The fault tolerant server according to claim 1, further comprising
a write history management unit that manages frequency of writing to each of the small regions, wherein
the small regions in the first group are small regions in each of which the frequency of writing managed by the write history management unit is not less than a threshold, and
the small regions in the second group are small regions in each of which the frequency of writing managed by the write history management unit is less than the threshold.

6. A physical computer on which a virtual computer of an active system operates, the virtual computer including a memory including a plurality of small regions grouped in a first group and a plurality of small regions grouped in a second group, the physical computer comprising:
a checkpoint detection unit that detects a checkpoint;
a transfer control unit that performs first processing and second processing, the first processing including, when a checkpoint is detected by the checkpoint detection unit, suspending the virtual computer of the active system, copying, to a transfer buffer, data of the small regions in the first group among the small regions of the memory having been updated after a previous checkpoint, and after inhibiting writing to the small regions in the second group, restarting the virtual computer of the active system, the second processing including copying data of the small regions, in which writing is inhibited, to the transfer buffer and releasing write inhibit, and transferring the data of the small regions, having been copied to the transfer buffer, to a second physical computer; and a non-uniform unit that makes a guest OS, operating on the virtual computer of the active system, believe that access distances to memory regions including the small regions are non-uniform, wherein the small regions in the first group are small regions on the memory regions each having an access distance less than an access distance threshold, and the small regions in the second group are small regions on the memory regions each having an access distance not less than the access distance threshold.

7. A transfer method implemented by a computer including a virtual computer of an active system, a checkpoint detection unit, a transfer control unit, and a non-uniform unit the virtual computer including a memory including a plurality of small regions grouped in a first group and a plurality of small regions grouped in a second group, the method comprising:

by the checkpoint detection unit, detecting a checkpoint;

by the transfer control unit, performing first processing and second processing, the first processing including, when a checkpoint is detected by the checkpoint detection unit, suspending the virtual computer of the active system, copying, to a transfer buffer, data of the small regions in the first group among the small regions of the memory having been updated after a previous checkpoint, and after inhibiting writing to the small regions in the second group, restarting the virtual computer of the active system, the second processing including copying data of the small regions, in which writing is inhibited, to the transfer buffer and releasing write inhibit, and transferring the data of the small regions, having been copied to the transfer buffer, to a second physical computer; and by the non-uniform unit, making a guest OS, operating on the virtual computer of the active system, believe that access distances to memory regions including the small regions are non-uniform, wherein the small regions in the first group are small regions on the memory regions each having an access distance less than an access distance threshold, and the small regions in the second group are small regions on the memory regions each having an access distance not less than the access distance threshold.

* * * * *